United States Patent [19]

Schrag

[11] 3,822,669

[45] July 9, 1974

[54] EMERGENCY BRAKE LEVER POSITION INDICATOR

[76] Inventor: Adam Schrag, Box 812, Salina, Kans. 67401

[22] Filed: June 5, 1973

[21] Appl. No.: 367,139

[52] U.S. Cl. ............ 116/114 R, 116/58 A, 188/1 A
[51] Int. Cl. ......................................... G01d 21/00
[58] Field of Search.... 116/58 A, 132, 114 R, 35 R; 188/1 A, 1 S

[56] References Cited
UNITED STATES PATENTS

| | | | |
|---|---|---|---|
| 1,623,472 | 4/1927 | Gurney | 116/58 A |
| 2,134,299 | 10/1938 | Cosner | 188/1 A |
| 2,544,953 | 3/1951 | Ekkelkamp | 116/58 A |
| 2,604,066 | 7/1952 | Salmon | 116/58 A |
| 3,479,982 | 11/1969 | Honcharenko | 116/35 R |

FOREIGN PATENTS OR APPLICATIONS 871,677   3/1953   Germany .............................. 116/70

Primary Examiner—Louis J. Capozi

[57] ABSTRACT

An elongated member is pivotally secured to the instrument panel of a vehicle at a point intermediate the ends but adjacent one end. Means interconnect the one end of the member to the emergency brake lever in such manner that when the lever is positioned to lock the brakes, the member is inclined with the other end raised and when the lever is positioned to unlock the brakes, the member is disposed horizontally. The means includes a cable extending between the one end of the member and the lever as well as a spring to damp the motion of the member and prevent oscillation.

1 Claim, 4 Drawing Figures

PATENTED JUL 9 1974  3,822,669

EMERGENCY BRAKE LEVER POSITION INDICATOR

SUMMARY OF THE INVENTION

My invention is directed to a device which can be installed in a vehicle to provide an accurate visual non electric indication of the position of the emergency brake lever.

To this end, I provide an elongated member disposed on top of the front instrument panel and pivotally secured thereto at a point intermediate both ends but adjacent one end.

Means interconnect the member to the emergency brake lever in such manner that the member is disposed essentially horizontally when the lever is positioned to release the brakes of the vehicle and the member is disposed in inclined position with the other end raised when the lever is positioned to lock the brakes of the vehicle.

Thus the position of the member provides an accurate visual non electric indication of the position of the brake lever which operates whether or not the electrical system of the vehicle is energized or the engine is running.

DETAILED DESCRIPTION OF PREFERRED EMBODIMENT

Figure 1:
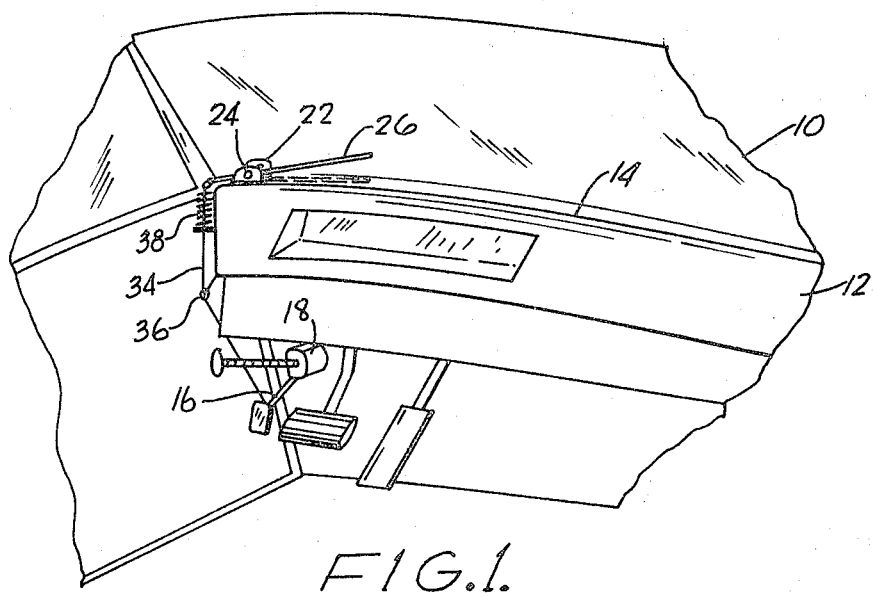
FIG. 1 is a detail interior perspective view of a vehicle using the invention.
Figure 2:
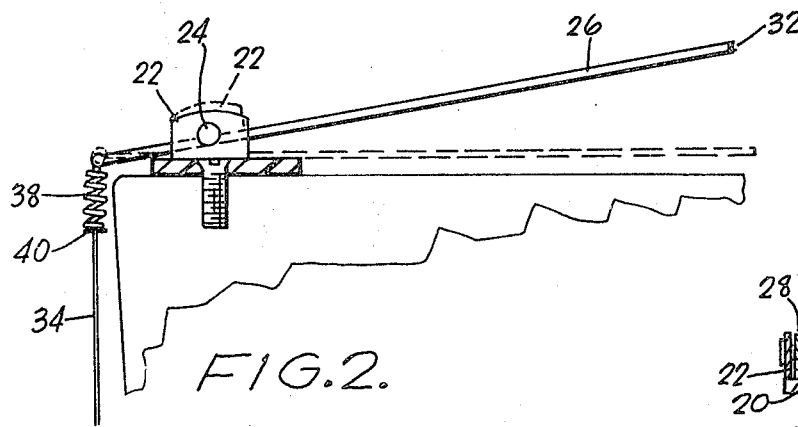
FIG. 2 is an enlarged detail side view of a portion of the structure shown in FIG. 1.
Figure 4:
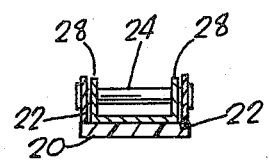
FIG. 4 is a view taken along line 4—4 in FIG. 3.
Figure 3:
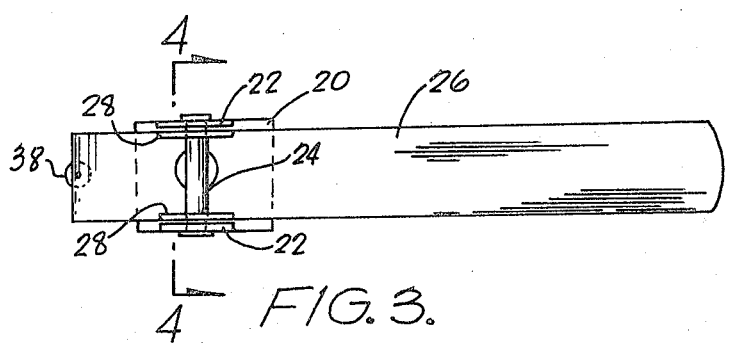
FIG. 3 is a top view of the structure of FIG. 2.

Referring now to FIGS. 1-4, a vehicle 10 is provided with a front instrument panel 12 having a top surface 14 and an emergency brake lever 16. The lever is pivoted downward in a vertical plane about connection 18 when the brakes are locked and is pivoted upward when the brakes are unlocked.

A bracket having a horizontal base 20 screwed or otherwise secured to surface 14 has two spaced parallel vertical plates 22 extending upward and lying in planes extending transversely to the longitudinal horizontal center line of the vehicle. A horizontal pin 24 extends transversely between plates 22.

An elongated flat member 26 has opposite vertical loops 28 disposed adjacent end 30 and remote from end 32. The pin extends through these loops whereby member 26 is pivotable about the pin.

A cable 34 is secured at one end to the midpoint of end 30 and is secured at its other end to lever 16. The cable can extend through eyes 36 or other intermediate its two ends.

A vertical coil spring 38 is disposed concentrically about the cable with its bottom end secured to the cable at 40 and its top end disposed adjacent and below end 30.

When the lever is pivoted downward to lock the brakes, end 30 is pulled downward and member 26 is placed in inclined position, end 32 up, to indicate that the brakes are locked. When the lever is pivoted upward to release the brakes, end 30 is raised since the weight of member 26 on the other side of the pivot pulls end 32 down. The member is thus disposed horizontally to indicate that the brakes are unlocked.

Spring 38 acts to prevent damping or oscillation of member 26 when end 30 is pulled downward.

While I have described my invention with particular reference to the drawings, such is not to be considered as limiting its actual scope.

Having thus described this invention, what is asserted as new is:

1. A device for use in a vehicle having an emergency brake lever and a front instrument panel with a horizontal shelf thereover for providing an accurate visual non-electric indication of the position of the lever, said device comprising:

an elongated member extending in a direction generally perpendicular to the horizontal longitudinal axis of the vehicle and disposed above the shelf;

first means disposed intermediate the ends of the member but adjacent one end thereof to pivotally support the member, said first means being secured to the shelf, said member being pivoted into an essentially horizontal position when the lever is released and the brakes unlocked, said member being pivoted into an inclined position with the other end of the member being raised above the one end of the member when the lever is placed in a position to lock the brakes; and second means connected between the member and the lever to position the member in accordance with the lever position and to damp the motion of the member to prevent oscillation thereof, the second means including a cable connected between the lever and the one end of the member and a coil spring disposed concentrically about the cable adjacent the member, the end of the spring remote from the member being secured to the cable, the other end of the spring being free to move and receiving said one end of the member.

* * * * *